Sept. 8, 1964
A. D. MOORE
3,148,241
CABLE SPLICE CASE WITH STRAIN RELIEF
Filed July 30, 1962
2 Sheets-Sheet 1
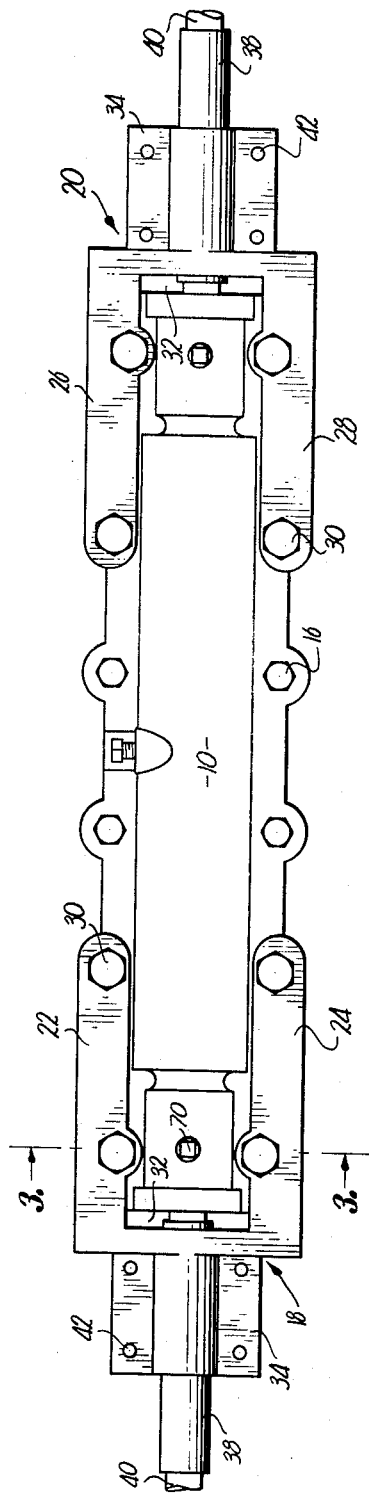
Fig.1.
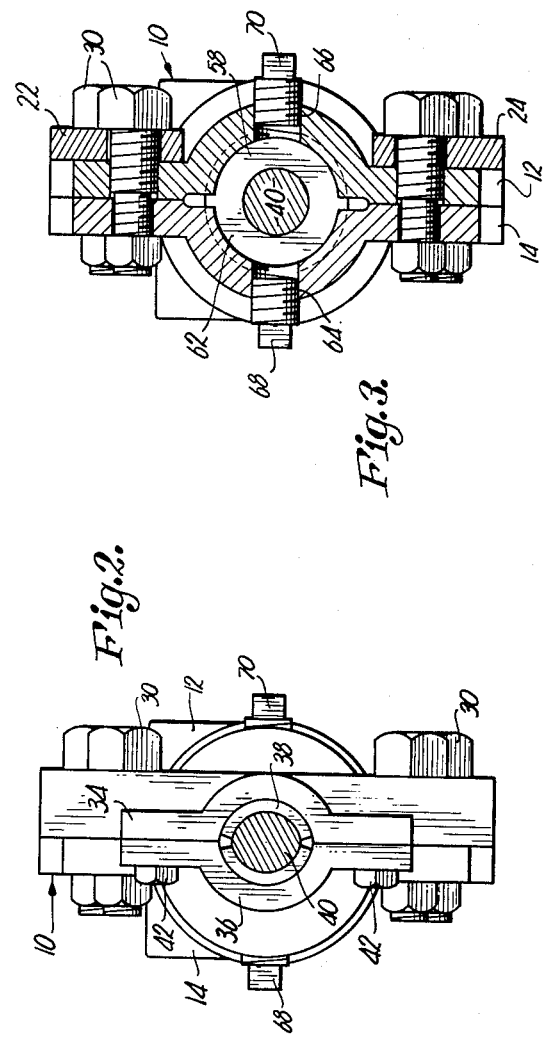
Fig.2.
Fig.3.
INVENTOR.
Alva D. Moore
BY
Hovey, Schmidt, Johnson & Hovey.
ATTORNEYS.

Sept. 8, 1964  A. D. MOORE  3,148,241
CABLE SPLICE CASE WITH STRAIN RELIEF
Filed July 30, 1962   2 Sheets-Sheet 2

INVENTOR.
Alva D. Moore
BY
Hovey, Schmidt, Johnson & Hovey
ATTORNEYS.

United States Patent Office 3,148,241
Patented Sept. 8, 1964

3,148,241
CABLE SPLICE CASE WITH STRAIN RELIEF
Alva D. Moore, Gardner, Kans., assignor of one-third each to Abram M. Stevens and Wilford E. Gault, both of Gardner, Kans.
Filed July 30, 1962, Ser. No. 213,511
5 Claims. (Cl. 174—92)

This invention relates to a splice case of the type used to surround portions of cable which have been interconnected by a splice, and particularly to improvements in such cases.

It is the most important object of this invention to provide a splice case comprised of a pair of interconnected sections which enclose the length of spliced cable, which splice case has a bracket secured to each end thereof, the bracket extending beyond the end of the splice case and being adapted to embrace in a clamping manner, a length of cable which extends from the corresponding end of the splice case.

It is a yet further object of this invention to provide a splice case wherein the conventional sealing tape is eliminated and there is provided a pair of tapped holes in the secondary chambers provided at each end of the case, the holes being utilized to introduce into said chambers, in surrounding relationship to the length of cable passing therethrough and between a pair of washers which define said secondary chambers, a sufficient amount of mastic material whereby to completely, properly and efficiently seal the end of the splice case and thereby prevent the entrance of air and water thereinto.

Other objects of this invention include details of construction which will become apparent from the following specification and accompanying drawings, wherein:

FIGURE 1 is a side elevational view of a splice case made pursuant to the present invention;

FIG. 2 is an enlarged, end elevational view thereof;

FIG. 3 is an enlarged, sectional view taken on line 3—3 of FIG. 1;

Figure 4:
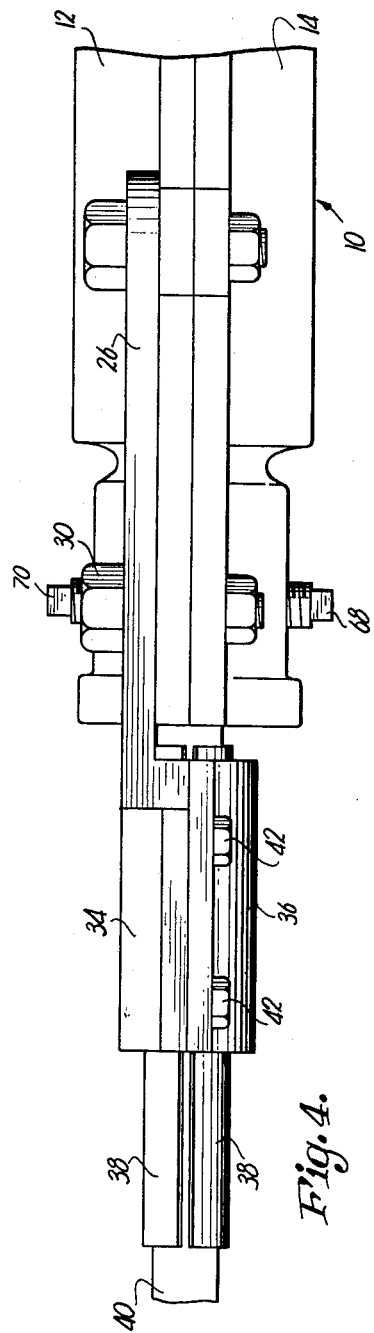
FIG. 4 is an enlarged, fragmentary, top plan view of one end of the splice case.

A conventional splice case 10, such as the type used to enclose splices made in cable for transmission purposes and the like, comprises a pair of interconnected sections such as 12 and 14, the sections being very similar in configuration and each having a plurality of outwardly extending lugs which are provided with corresponding openings whereby bolts, such as 16, may be utilized to interconnect the sections 12 and 14.

Such cases 10 are conventionally used to protect splices made in cable which is disposed below the ground, and it is desirable not only that the splice case 10 prevent the entrance of air into the area surrounding the splice, but that it additionally function to retain in said area the gas or dry air which is normally introduced under pressure into such cable systems. It is also important that the splice case be securely retained in position with respect to the cable in connection with which it is used and that the same not result in damage to the cable.

To this end, a conventional splice case as 10 has been modified by the provision of a pair of brackets 18 and 20, there being one of such brackets disposed at each end of the case 10. The brackets are identical in construction and each includes a pair of arms, designated as 22 and 24 in the case of bracket 18, and as 26 and 28 in the case of bracket 20, said arms being connected to the case 10 as by bolts 30 whereby to rigidly secure the same thereto, it being contemplated that bolts 30 may be positioned in one of the holes provided in the lugs of the case 10 which is normally occupied by bolts such as 16.

Figure 5:
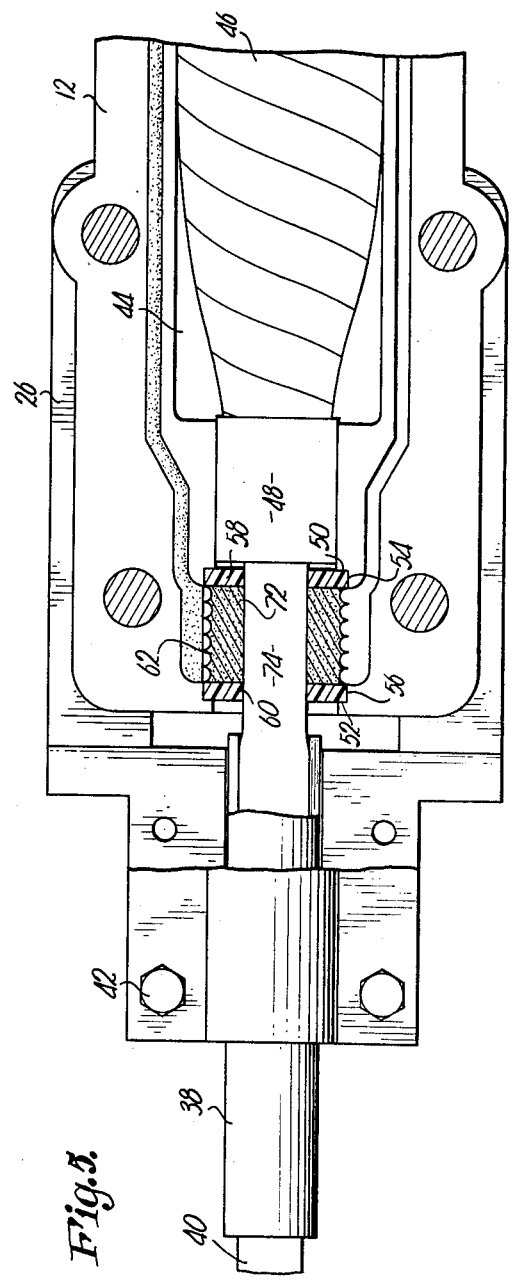
FIG. 5 is an enlarged, elevational view of one end of the splice case, one of the sections being removed and portions being in section to reveal details of construction.

It will be noted that the brackets 18 and 20 extend outwardly from the corresponding ends of the splice case 10 and that there is a space 32 provided between the end of the case 10 and the next adjacent portion of the brackets 18 and 20. The brackets 20 also include a main plate 34 and a clamping plate 36, as best seen in FIGS. 2, 4 and 5 of the drawings, said plates being configured in such a manner as to provide a passageway therethrough, which passageway receives therewithin a split sleeve 38, the sleeve 38 receiving therewithin the corresponding length of cable as 40.

Sleeve 38 is split throughout its length whereby to divide the same into two substantially identical portions, the portions being disposed on each side of the corresponding length of cable as 40 as extending throughout the length of plates 34 and 36, the inner end of the split sleeve extending into the corresponding space 32 and the outer end thereof extending outwardly beyond the end of the corresponding bracket 18 or 20.

It is preferred that the split sleeve 38 be of a resilient material whereby to absorb any pressures which may be brought to bear thereupon through a bending of the cable 40 beyond its point of embracement by sleeve 38, and thus prevent kinking or bending the cable itself by the brackets 18 and 20.

It will be noted that sleeve 38, and the cable 40 received therewithin, is tightly clamped between the plates 34 and 36 of brackets 18 and 20 through the provision of bolts 42. It is desired that the brackets 18 and 20, through plates 34 and 36 thereof, embrace the cable 40, which extends beyond the ends of the splice case 10, at a point spaced from the end of the splice case whereby, when the cable is bent or twisted, the twisting force will not be imparted to the seals disposed within the splice case 10 and which will be described hereinafter.

Thus, mechanical support is provided for the lengths of cable 40 beyond the ends of the case 10, and this exterior gripping of the cable prevents stresses and strains being imparted to the point of seal disposed at the end of the splice case 10, which point of seal must be retained intact and effective at all times.

The sealing means for a splice case, as hereinabove referred to, has also been improved and in this regard, it will be noted that the sections 12 and 14 of the splice case 10, when in their engaged positions, cooperate to define a central chamber 44, which chamber 44 receives the spliced portion 46 of the cable 40, which splice portion is normally wound with several lengths of tape as illustrated for instance, in FIG. 5 of the drawings.

The portion of the cable next adjacent both ends of the spliced portion 46 is engaged by a clamp, one of the same being shown in FIG. 5 and designated as 48, which clamp 48 is received within a corresponding area of the central chamber 44.

The sections 12 and 14 of the case 10 cooperate to present a first annular shoulder 50 as seen in FIG. 5 of the drawings, and a second annular shoulder 52, which shoulders 50 and 52 each define a groove 54 and 56 respectively, each of said grooves having a washer 58 and 60 received therewithin, said washers 58 and 60 cooperating to define a secondary chamber 62. The outer walls of chamber 62 are defined by corresponding portions of the sections 12 and 14 of case 10, and it will be noted that, as shown in FIG. 3, each of said chambers 62 is provided with a pair of opposed tapped holes designated as 64 and 66, there being a threaded plug as 68 and 70 respectively for closing said holes 64 and 66.

Holes 64 and 66 are utilized to introduce into the corresponding secondary chamber 62, a sufficient amount of mastic material such as 72 whereby to completely fill said secondary chamber 62 and thus provide a tight and efficient seal around the length of cable 74 which extends through the chambers 62.

It is contemplated that the mastic material 72 will be introduced into the chamber 62 by removing both plugs 68 and 70 and thence introducing, through one of the holes 64 or 66, and under sufficient pressure, the mastic material until such time as the same fills the chamber 62 and commences to leave the same through the opposed hole therein. At this time, the plugs may be inserted in both holes and it has been insured that the chamber is fully filled with the mastic material which serves to create an air-tight and water-tight seal at the end of the splice case and to completely prevent the admission of air or water into the splice case 10. It has been found preferable in this regard to use a nonsetting mastic material, and in this respect, it will be appreciated that several possible materials of a mastic nature may be utilized.

The improvements hereinabove described have been found to create a more efficient and useable splice case, and the combination of an effective sealing means at the opposed ends of the case, together with the brackets such as hereinabove described which embrace the cable at a point spaced from the end of the case, has been determined to result in a more satisfactory splice case.

Having thus described the invention, what is claimed as new and desired to be secured by Letters Patent is:

1. In a splice case having a pair of interconnected sections enclosing a length of spliced cable, the cable extending beyond the ends of the case, the improvement comprising a bracket at each end of the case carried by a pair of arms and extending outwardly therebeyond, said brackets each embracing a corresponding length of cable at a point spaced from the end of said case.

2. A splice case as set forth in claim 1, there being a sleeve surrounding the length of cable embraced by each of said brackets.

3. A splice case as set forth in claim 2, wherein said sleeve is split longitudinally thereof to divide the same into two identical portions.

4. In a splice case having a pair of interconnected sections enclosing a length of spliced cable, the cable extending beyond the ends of the case; a bracket secured to each end of the case, each of said brackets having a pair of arms attaching the same to the case; a plate carried by said bracket and cooperable therewith to clamp a corresponding length of cable to the bracket, said plate and said bracket embracing a corresponding length of cable at a point spaced from the end of the case; a split sleeve of resilient material surrounding said length of cable and held in position with respect thereto by said bracket and said plate; a central chamber defined by said interconnected sections; a secondary chamber at each end of said central chamber, said secondary chambers each being defined by a pair of opposed washers, the unspliced cable extending through each of said secondary chambers; and a mastic material filling each of said secondary chambers.

5. In a splice case having a pair of interconnected sections enclosing a length of spliced cable, the cable extending beyond the ends of the case, a bracket spaced from each end of the case, each of said brackets having at least one arm attaching the same to the case, said brackets each retaining a length of cable at a point spaced from the end of the case; a central chamber defined by said sections; a secondary chamber at each end of said central chamber, the cable extending through each of said secondary chambers; and a mastic material filling each of said secondary chambers.

References Cited in the file of this patent

UNITED STATES PATENTS

| | | |
|---|---|---|
| 1,137,931 | Travers et al. | May 4, 1915 |
| 2,621,228 | Tompers | Dec. 9, 1952 |
| 2,839,596 | Cheney et al. | June 17, 1958 |
| 2,867,680 | Stecher | Jan. 6, 1959 |
| 2,930,835 | Bollmeier | Mar. 29, 1960 |
| 2,938,940 | Calendine et al. | May 31, 1960 |
| 3,061,666 | Duvall et al. | Oct. 30, 1962 |